US010232676B2

(12) United States Patent
Christian et al.

(10) Patent No.: US 10,232,676 B2
(45) Date of Patent: Mar. 19, 2019

(54) GOOSENECK HITCH LOCKING APPARATUS AND SYSTEM

(71) Applicants: Jeddidiah M. Christian, Lander, WY (US); Martin E. Christian, Lander, WY (US)

(72) Inventors: Jeddidiah M. Christian, Lander, WY (US); Martin E. Christian, Lander, WY (US)

(*) Notice: Subject to any disclaimer, the term of this patent is extended or adjusted under 35 U.S.C. 154(b) by 70 days.

(21) Appl. No.: 15/630,811

(22) Filed: Jun. 22, 2017

(65) Prior Publication Data

US 2018/0370308 A1 Dec. 27, 2018

(51) Int. Cl.
*B60D 1/26* (2006.01)
*B60D 1/06* (2006.01)
*B60D 1/24* (2006.01)

(52) U.S. Cl.
CPC .............. *B60D 1/26* (2013.01); *B60D 1/065* (2013.01); *B60D 1/246* (2013.01)

(58) Field of Classification Search
CPC ............. B60D 1/06; B60D 1/065; B60D 1/26
See application file for complete search history.

(56) References Cited

U.S. PATENT DOCUMENTS

| 3,889,979 | A  | * | 6/1975  | Schmiesing | A01B 59/042 172/272 |
| 8,888,121 | B2 | * | 11/2014 | Trevino    | B60D 1/36 280/477 |
| 8,910,965 | B2 | * | 12/2014 | LaPrade    | B60D 1/06 280/441.2 |
| 9,132,707 | B2 | * | 9/2015  | LaPrade    | B60D 1/06 |
| 2003/0047908 | A1 | * | 3/2003 | Lara       | B60D 1/065 280/441.2 |
| 2016/0361959 | A1 | * | 12/2016 | Keatley   | B60D 1/64 |

* cited by examiner

*Primary Examiner* — Kevin Hurley

(57) ABSTRACT

A gooseneck hitch locking apparatus and system that is safe and reliable, can standup to a large range of weather conditions, and can be activated remotely thereby allowing for the coupling/uncoupling of a trailer to a towing vehicle without requiring a user to climb into/out of the bed of the towing vehicle. A remotely controlled actuator raises and lowers a locking pin through a locking hole of a gooseneck hitch with a force loaded ball hitch locking plate, thereby preventing the locking plate from moving and keeping the coupled ball hitch from uncoupling. A handle connected to the locking pin is connected to the actuator via a fastener. The fastener may be removed, thereby allowing manual operation of the gooseneck hitch locking apparatus and system via the handle, thus allowing the manual coupling or uncoupling of a the trailer from a towing vehicle.

20 Claims, 6 Drawing Sheets

GOOSENECK HITCH LOCKING APPARATUS AND SYSTEM

TECHNICAL FIELD

The embodiments herein relate to the field of trailer couplers, and more particularly, to a gooseneck hitch locking apparatus and system. Furthermore, the embodiments herein disclose improvements in ease of use and safety over previous available trailer couplers.

BACKGROUND

Many coupling devices are available for attaching a vehicle to a trailer. When towing a trailer with a vehicle the number one concern is safety. Gooseneck type hitches have proven over time to be both safe and reliable. Next to safety, an important consideration is the ease, convenience, and effort required to attach (hitch) a trailer with a gooseneck hitch to a towing vehicle. Typically, a user will to climb over either the back of the bed of the towing vehicle, for example a truck, or the side of the bed of the truck to gain access to the gooseneck hitching mechanism. Climbing over either the back or the truck can be difficult, uncomfortable, and even dangerous. Furthermore, climbing into the bed of a truck often results in damage to the body of the truck. This is especially troublesome when climbing over the side where scratches can often be seen on the body of the truck where a user has climbed over. Once a user gains access to the bed of the truck they often must stay in an uncomfortable position while manually attaching the gooseneck hitch mechanism of the trailer to the towing vehicle which requires manually moving a handle and then lowering a locking pin into a receiving hole. What is needed is a safe and reliable hitching mechanism that can be attached automatically and remotely, and therefore, does not require a user to climb into the bed of the truck.

SUMMARY OF THE INVENTION

The embodiments herein describe a gooseneck hitch locking apparatus and system that is safe and reliable, can standup to a large range of weather conditions, and can be activated remotely, thereby allowing a user to couple or uncouple a trailer from a towing vehicle remotely and conveniently. Unlike existing systems, the gooseneck hitch locking apparatus and system as described herein, is much simpler with less moving parts that can fail and includes a manual operation backup in the case of a power failure, thereby ensuring continuous operation.

BRIEF DESCRIPTION OF THE FIGURES

The embodiments herein will be better understood from the following detailed description with reference to the drawings, in which.

DETAILED DESCRIPTION OF EMBODIMENTS

Figure 1:
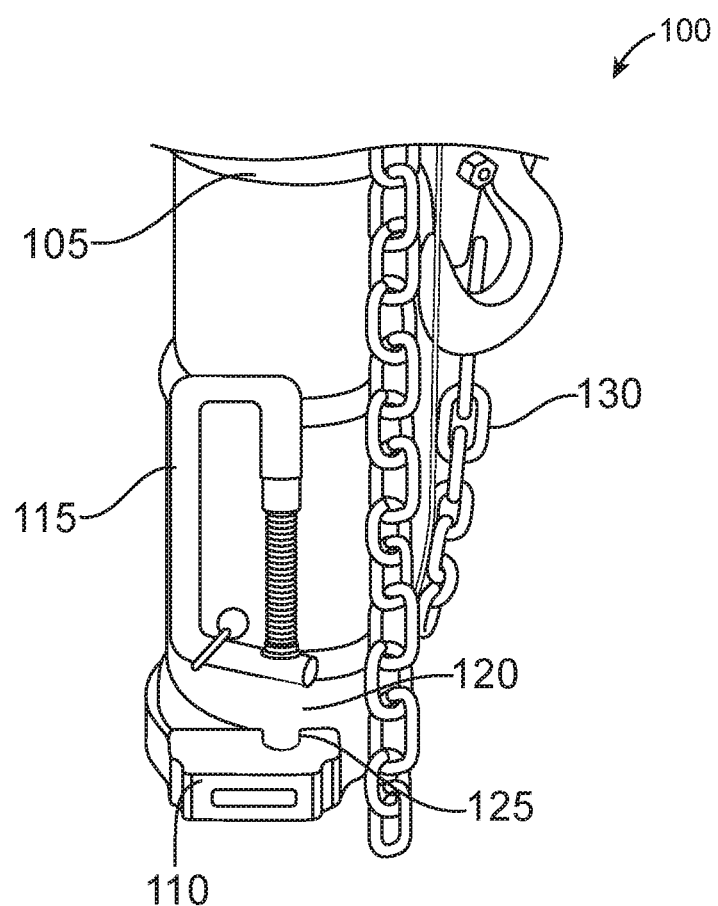
FIG. 1 is an example of the traditional style of a gooseneck trailer hitch with a locking pin and coupler arrangement, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments described herein describe a method and system for a gooseneck hitch locking apparatus and system. Various advantages of the embodiments as described herein will become apparent to those skilled in the art but by way of example only may include safety, convenience, and reliability when coupling and uncoupling a trailer to a towing vehicle. The gooseneck hitch locking apparatus and system allows a user to couple or uncouple a trailer from a towing vehicle, for example a truck, via a gooseneck hitch locking apparatus remotely, thereby not requiring a user to climb into and out of the bed of the towing vehicle to do so.

Referring now to the drawings, and more particularly to FIGS. 1 through 5, where similar reference characters denote corresponding features consistently throughout the figures, there are shown embodiments.

FIG. 1 is an example of the traditional style of a gooseneck trailer hitch with a locking pin and coupler arrangement, according to embodiments as disclosed herein. The gooseneck trailer hitch 100 comprises a gooseneck shaft 105 that may vary in shape. By way of example, shaft 105 may be shaped substantially round or square, and may be constructed of various materials such as metals, alloys, etc. A locking plate 110 is provided with a hole 115 all the way through it. A locking pin 120 is attached to a handle 125. Inside the bottom of the shaft 105 is a pressure type coupling mechanism (not shown) that couples a hitch ball (not shown). This style of coupling mechanism and its operation are well known in the art. It offers the advantage of allowing the placing of the coupling mechanism on the hitch ball at any angle and allows automatic opening and closing of the coupling mechanism to the hitch ball. Once the coupling mechanism of the gooseneck trailer hitch 100 which is attached to a trailer is coupled with a hitch ball attached to the bed of the truck, the user lines up the locking pin 120 with the handle 125 and lowers the locking pin 120 through the hole 115 in the locking plate 110 which prevents the locking plate 110 from moving to either side, thereby ensuring the hitch ball remains connected to the coupling mechanism and the trailer remains attached to the towing vehicle.

Typically, the locking plate 110 is designed to move laterally. A user lines up the hole 115 with the locking pin 120 using the locking plate 110 when they want the coupling mechanism to remain in a closed position and then inserts the locking pin 120 through the whole to ensure the locking plate 110 does not change positions. The user removes the locking pin 120 from the hole 115 and moves the locking plate 110 laterally when they want the coupling mechanism to remain open, thus allowing them to couple or uncouple the hitch ball. In some embodiments, the locking plate 110 is force loaded so that after the hitching mechanism is coupled or uncoupled to the hitch ball, the locking plate 110 automatically returns to the position wherein the hole 115 is lined up with the locking pin 120, thereby allowing a user to easily insert the locking pin 120 into the hole 115 without having to align hole 115. In some embodiments, the force provided to the locking plate 110 may be provided by a spring (not shown) or other means.

A chain 130, may optionally be provided for attaching the gooseneck trailer hitch 105 to a coupled trailer to provide redundancy and safety in the event the coupling mechanism fails and the trailer becomes uncoupled from the towing vehicle.

Figure 2A:
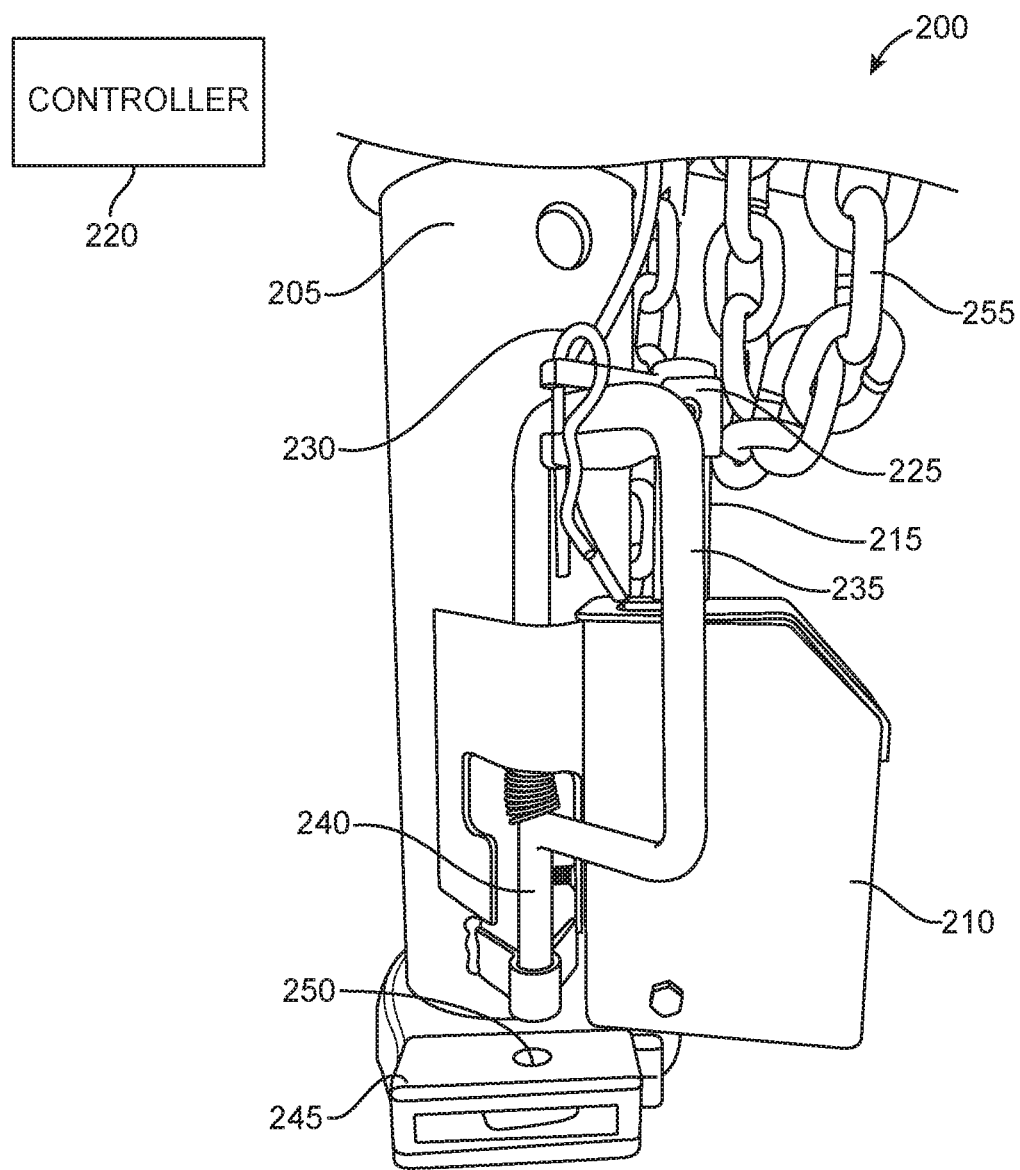
FIG. 2A is a front view of a gooseneck hitch locking apparatus and system, according to embodiments as disclosed herein.

FIG. 2A is a front view of a gooseneck hitch locking apparatus and system, according to embodiments as disclosed herein. Assembly 200 has a shaft 205 that is typically attached to a trailer to be towed (not shown). An actuator housing 210 containing an actuator 215 is attached to the shaft 205 via an attaching means. It will be appreciated by those skilled in the art that the attaching means may be a bracket, screws, bolts, etc. or may be welded on. A controller 220 controls the actuator 215 via either a close-hitch input signal or an open-hitch input signal. The controller 220 may be hardwired to the actuator 215 or may use any of the various well known wireless technologies such as cellular, radio, RF, Bluetooth, WiFi, etc. The actuator 215 is attached to an actuator arm 225 via a fastener 230. The fastener 230 is attached to a handle 235 which is attached to, or is part of a locking pin 240, wherein when the actuator 215 is raised or lowered, the locking pin 240 is simultaneously raised or lowered. The fastener 230 may be any type of fastener, but is preferably a fastener that can be quickly removed. In one embodiment, the fastener 230 is a cotter pin.

Attached to the bottom of the shaft 205 is a locking plate 245 which has a hole 250 completely through it so that the locking pin 240 can be inserted completely through the hole 250 when the two parts are lined up. If the input signal received by actuator 215 from the controller 220 is an open-hitch input signal, the actuator 215 raises the locking pin 240 out of the hole 250, thereby allowing the locking plate 245 to move laterally, thereby allowing the coupled ball hitch to be uncoupled, thus uncoupling the trailer from the towing vehicle.

A chain 255, may optionally be provided for attaching the gooseneck trailer hitch 200 to a coupled trailer to provide redundancy and safety in the event the coupling mechanism fails and the trailer becomes uncoupled from the towing vehicle.

Figure 2B:
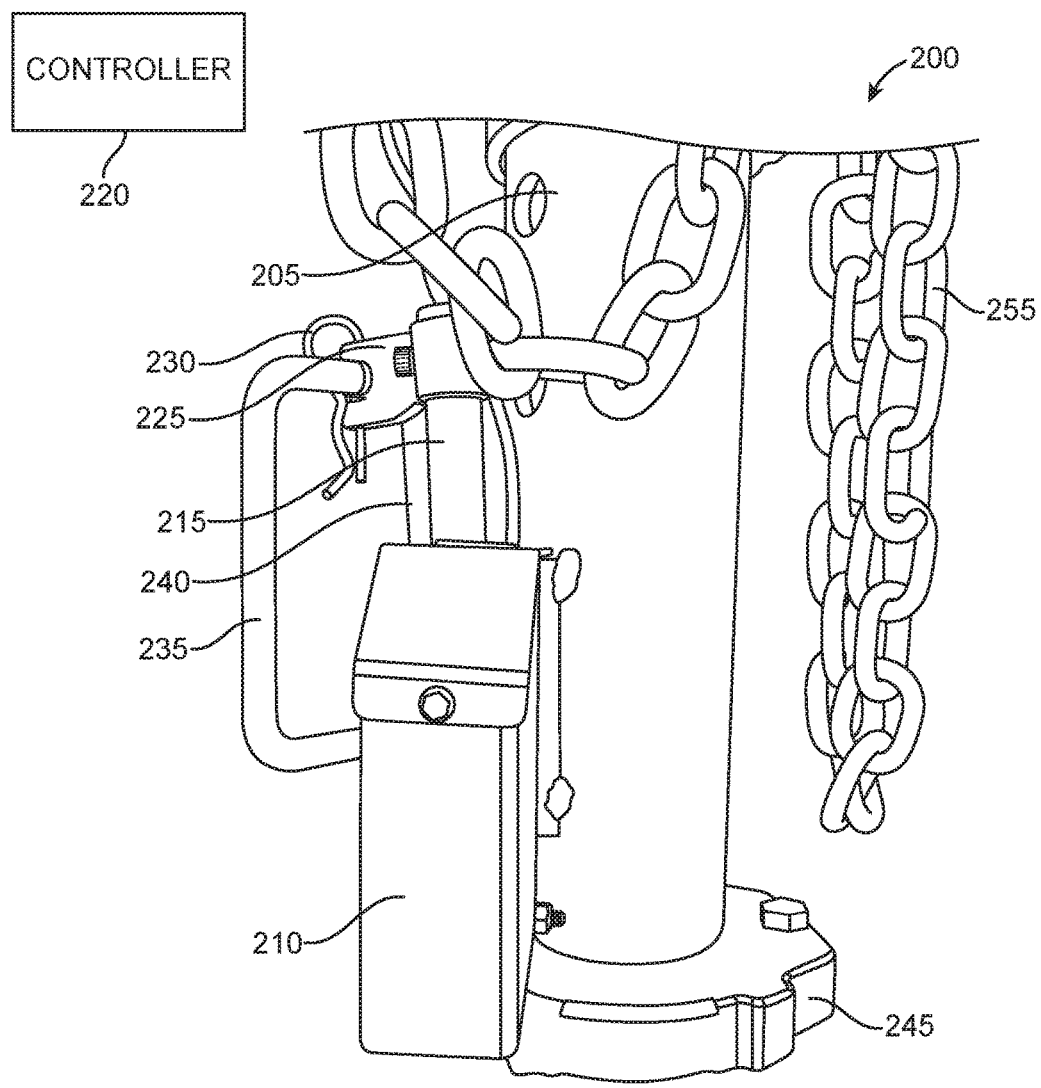
FIG. 2B is a rear view of a gooseneck hitch locking apparatus and system, according to embodiments as disclosed herein.

FIG. 2B is a rear view of a gooseneck hitch locking apparatus and system, according to embodiments as disclosed herein.

Figure 3:
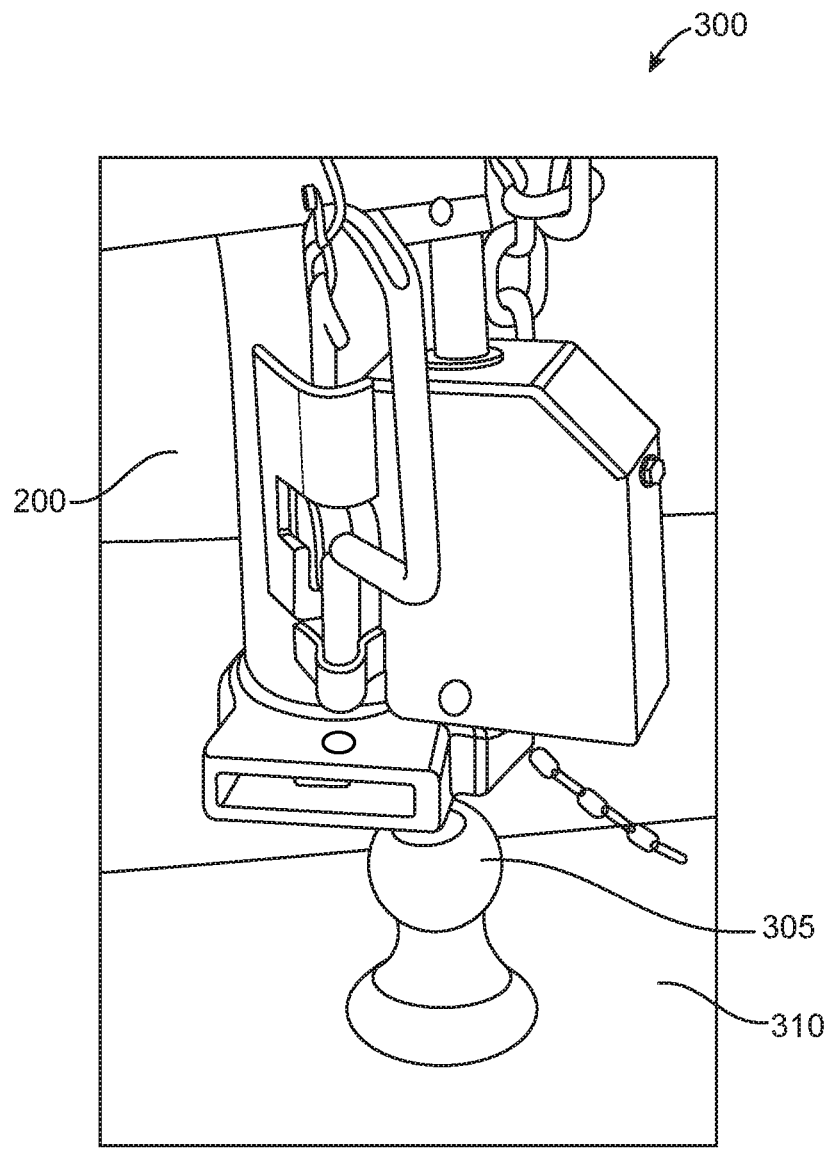
FIG. 3 is a view of a gooseneck hitch locking apparatus and system positioned to be attached to the hitch ball of a towing vehicle, according to embodiments as disclosed herein.

FIG. 3 is a view of a gooseneck hitch locking apparatus and system positioned to be attached to the hitch ball of a towing vehicle, according to embodiments as disclosed herein. View 300 shows assembly 200 in positioned over a hitch ball 305 attached to attached to the bed of a towing vehicle 310, for example a truck (not shown).

Figure 4:
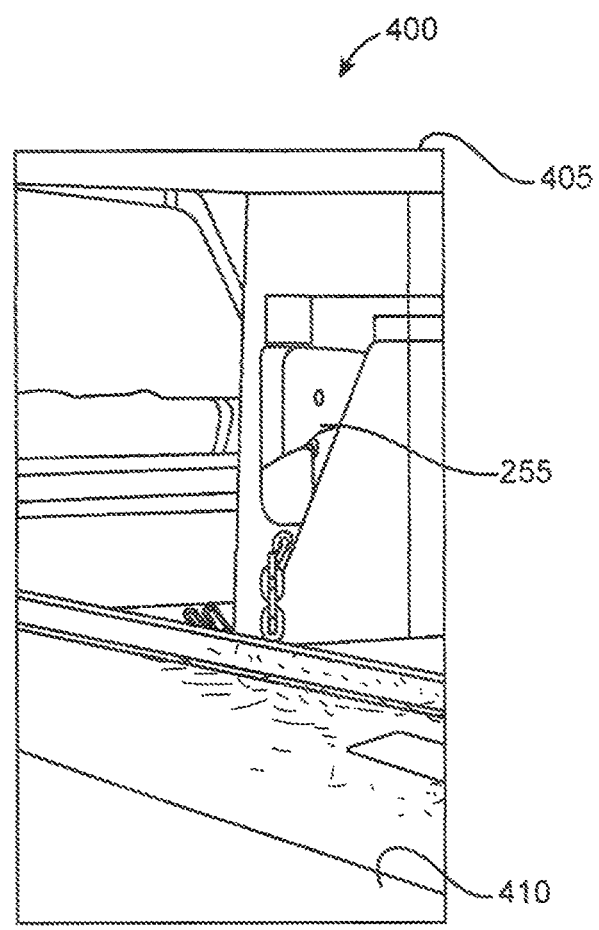
FIG. 4 is a view of a gooseneck hitch locking apparatus and system connected to the hitch ball of a towing vehicle, according to embodiments as disclosed herein.

FIG. 4 is a view of a gooseneck hitch locking apparatus and system connected to the hitch ball of a towing vehicle, according to embodiments as disclosed herein. View 400 shows part of the front of a trailer 405 attached to a goose neck hitch 200 positioned in the bed of a towing vehicle 410.

Figure 5A:
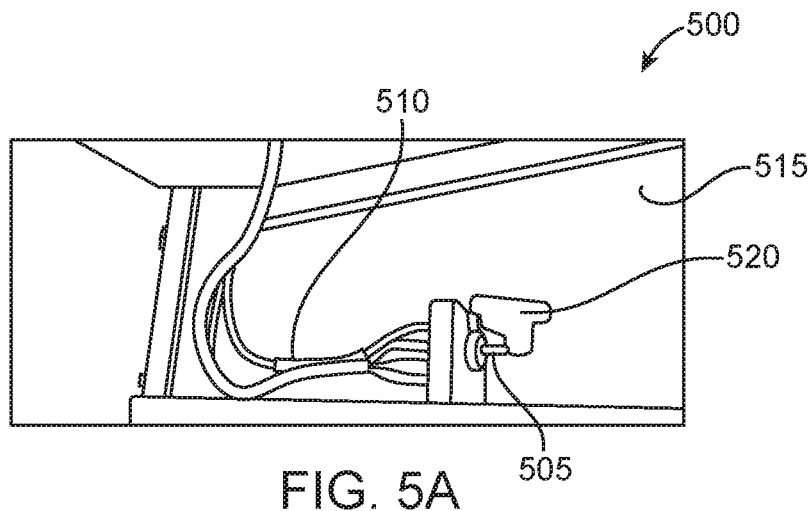
FIG. 5A is an example of a remote toggle switch located on the front underside of a trailer, according to embodiments as disclosed herein.

FIG. 5A is an example of a remote toggle switch located on the front underside of a trailer, according to embodiments as disclosed herein. View 500 shows a controller using a toggle switch 505 using hardwiring 510 situated in the inside panel of the front overhang of a trailer 515. In this embodiment, the toggle switch 505 is hardwired 510 into the existing power wiring of the trailer. A toggle switch 505 safety hood 520 may be provided to prevent accidental contact with the switch, thereby providing a safety feature to prevent the accidental coupling or uncoupling of an attached trailer. The hardwiring 510 is shown exposed for easy viewing, but may be covered for protection from the elements and safety concerns. In some embodiments, the trailer may use a standard on-board power of approximately 12 Volts DC. It will be understood by those of ordinary skill in the art that may other wiring configurations, locations, and voltages may be used, as well as a large range of wireless controlling configurations and protocols.

Figure 5B:
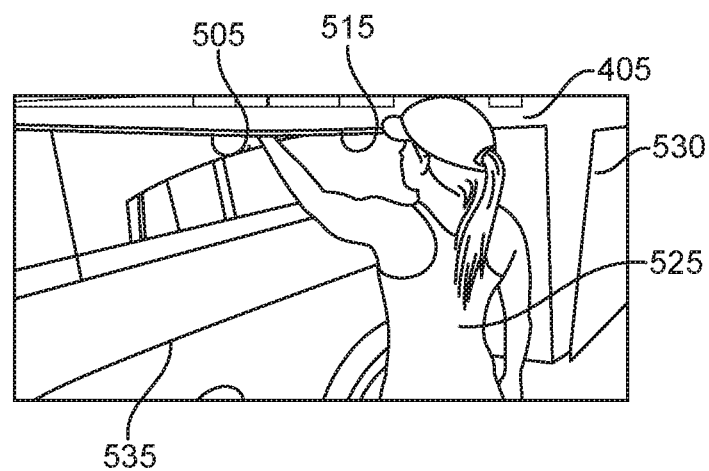
FIG. 5B is an example of a user accessing a remote toggle switch located on the front underside of a trailer, according to embodiments as disclosed herein.

FIG. 5B is an example of a user accessing a remote toggle switch located on the front underside of a trailer, according to embodiments as disclosed herein. Shown is the front of a trailer 400 with a user 525 reaching under the inside panel of the front overhang of a trailer 515 (not shown) to access a toggle switch 505 (not shown) for controlling the coupling and decoupling of a towing vehicle 530 to a trailer 535.

What is claimed is:

1. A gooseneck hitch locking apparatus for use with a gooseneck hitch with a force loaded ball hitch locking plate, the apparatus comprising:
    an actuator housing engagably attached to a gooseneck hitch, wherein the actuator housing comprises an actuator;
    a controller for providing an input signal to the actuator, wherein the actuator is raised or lowered based on receiving either an open-hitch or close-hitch input signal;
    an actuator arm for connecting the actuator to a handle attached to a locking pin via a fastener, wherein when the actuator is raised or lowered the locking pin is simultaneously raised or lowered through a locking hole via the actuator arm;
    wherein if the input signal received is a close-hitch input signal, the actuator lowers the pin through the hole, thereby preventing a force loaded locking plate from moving and thus keeping a coupled ball hitch from uncoupling; and
    wherein if the input signal received is an open-hitch input signal, the actuator raises the pin out of the hole, thereby allowing the locking plate to move and thus allowing the coupled ball hitch to be uncoupled.

2. The apparatus of claim 1, wherein if the fastener is removed, the raising or lowering of the locking pin may be controlled manually via the handle.

3. The apparatus of claim 2, wherein the fastener is a cotter pin.

4. The apparatus of claim 1, wherein the controller is connected to the actuator either via hardwiring or wirelessly.

5. The apparatus of claim 4, wherein the wireless connection may be cellular, radio, RF, Bluetooth, WiFi, or a combination thereof.

6. The apparatus of claim 1, wherein the controller includes a switch.

7. The apparatus of claim 6, wherein the switch is a toggle switch.

8. The apparatus of claim 7, wherein the toggle switch includes a safety hood.

9. The apparatus of claim 6, wherein the switch is hardwired to the existing electrical wiring and power of the trailer.

10. The apparatus of claim 6, wherein the switch is located on or near a front-underside of the trailer.

11. A gooseneck hitch locking system for use with a trailer having an attached gooseneck hitch having a force loaded ball hitch locking plate and a towing vehicle having a hitching ball mounted in the bed of the towing vehicle for coupling with the gooseneck, the system comprising:
   an actuator housing engagably attached to a gooseneck hitch, wherein the actuator housing comprises an actuator
   a controller for providing an input signal to the actuator, wherein the actuator is raised or lowered based on receiving either an open-hitch or close-hitch input signal;
   an actuator arm for connecting the actuator to a handle attached to a locking pin via a fastener, wherein when the actuator is raised or lowered the locking pin is simultaneously raised or lowered through a locking hole via the actuator arm;
   wherein if the input signal received is a close-hitch input signal and if the hitching ball is coupled to a force loaded locking plate, the actuator lowers the pin through the hole, thereby preventing the locking plate from moving and keeping a coupled ball hitch from uncoupling, and thus the trailer, from uncoupling from the towing vehicle; and
   wherein if the input signal received is an open-hitch input signal, the actuator raises the pin out of the hole, thereby allowing the locking plate to move and allowing the coupled ball hitch to be uncoupled, thus uncoupling the trailer from the towing vehicle.

12. The system of claim 11, wherein if the fastener is removed, the raising or lowering of the locking pin may be controlled manually via the handle.

13. The system of claim 12, wherein the fastener is a cotter pin.

14. The system of claim 11, wherein the controller is connected to the actuator either via hardwiring or wirelessly.

15. The system of claim 14, wherein the wireless connection may be cellular, radio, RF, Bluetooth, WiFi, or a combination thereof.

16. The system of claim 1, wherein the controller includes a switch.

17. The system of claim 16, wherein the switch is a toggle switch.

18. The system of claim 17, wherein the toggle switch includes a safety hood.

19. The system of claim 16, wherein the switch is hardwired to the existing electrical wiring and power of the trailer.

20. The system of claim 16, wherein the switch is located on or near a front-underside of the trailer.

* * * * *